US012467090B2

(12) United States Patent
Chung et al.

(10) Patent No.: US 12,467,090 B2
(45) Date of Patent: Nov. 11, 2025

(54) METHOD FOR ASSESSING RISK OF CUTANEOUS ADVERSE DRUG REACTIONS CAUSED BY EPIDERMAL GROWTH FACTOR RECEPTOR INHIBITORS, DETECTION KIT THEREOF, AND USE THEREOF

(71) Applicant: CHANG GUNG MEMORIAL HOSPITAL, LINKOU, Taoyuan (TW)

(72) Inventors: Wen-Hung Chung, Taoyuan (TW); Shuen-Iu Hung, Taoyuan (TW); Chun-Bing Chen, Taoyuan (TW); Chun-Wei Lu, Taoyuan (TW); Chuang-Wei Wang, Taoyuan (TW)

(73) Assignee: CHANG GUNG MEMORIAL HOSPITAL, LINKOU, Taoyuan (TW)

( * ) Notice: Subject to any disclaimer, the term of this patent is extended or adjusted under 35 U.S.C. 154(b) by 947 days.

(21) Appl. No.: 17/634,283

(22) PCT Filed: Aug. 16, 2019

(86) PCT No.: PCT/CN2019/100908
§ 371 (c)(1),
(2) Date: Feb. 10, 2022

(87) PCT Pub. No.: WO2021/030925
PCT Pub. Date: Feb. 25, 2021

(65) Prior Publication Data
US 2023/0076745 A1   Mar. 9, 2023

(51) Int. Cl.
*C12Q 1/6881* (2018.01)
*C12Q 1/6883* (2018.01)
*G01N 33/68* (2006.01)

(52) U.S. Cl.
CPC ......... *C12Q 1/6881* (2013.01); *C12Q 1/6883* (2013.01); *G01N 33/6893* (2013.01); *C12Q 2600/118* (2013.01); *G01N 2800/50* (2013.01); *G01N 2800/56* (2013.01)

(58) Field of Classification Search
None
See application file for complete search history.

(56) References Cited
U.S. PATENT DOCUMENTS

| | | | |
|---|---|---|---|
| 2015/0225788 A1* | 8/2015 | Chung | C12Q 1/6883 506/9 |
| 2016/0186265 A1 | 6/2016 | Andre et al. | |
| 2017/0022561 A1 | 1/2017 | Chung et al. | |
| 2022/0177968 A1* | 6/2022 | Roujeau | C12Q 1/6883 |

FOREIGN PATENT DOCUMENTS

| | | |
|---|---|---|
| CN | 105039579 A | 11/2015 |
| CN | 106755291 A | 5/2017 |
| JP | 2014524736 | 9/2014 |
| WO | 174723 | 12/2012 |

OTHER PUBLICATIONS

Y. Park et al., "Evaluation of sequence-specific priming and real-time polymerase chain reaction assays for detecting HLA-B51 alleles confirmed by sequence-based typing" Tissue Antigens, Dec. 31, 2012, pp. 376-379, vol. 80.
International Search Report and Written Opinion for PCT/CN2019/100908, mailed May 18, 2020.
Office Action for related Taiwan application 108129235, mailed Jul. 24, 2020.
Office Action for related Taiwan application 108129235, mailed Oct. 29, 2020.
Shuen-Iu Hung et al., "Common risk allele in aromatic antiepileptic-drug induced Stevens-Johnson syndrome and toxic epidermal necrolysis in Han Chinese," Pharmacogenomics Mar. 2010, pp. 349-356, vol. 11 No. 3.
Fang Wang et al., "Trends in culprit drugs and clinical entities in cutaneous adverse drug reactions: a retrospective study," Cutan Ocul Toxicol, Apr. 2017.
Office action for Canadian Patent Application No. 3,151,271, mailed Feb. 24, 2023.
Office action for Japan Patent Application No. 2022-508561, mailed Jan. 31, 2023.
Office action for China Patent Application No. 201980098554.0, mailed Feb. 28, 2023.
Office action for Europe Patent Application No. 19942341.9, mailed Apr. 17, 2023.
Jara Baas et al., "Genome wide association study to identify predictors for severe skin toxicity in colorectal cancer patients treated with cetuximab," PLOS One, Dec. 17, 2018, vol. 13, No. 12.
Akiko Kubo et al., "Biomarkers of skin toxicity induced by anti-epidermal growth factor receptor antibody treatment in colorectal cancer," World Journal of Gastroenterology, Jan. 14, 2016, pp. 887-894, vol. 22, No. 2.
Lupu I et al., "Cutaneous adverse reactions specific to epidermal growth factor receptor inhibitors," Journal of Medicine and Life, Jan. 1, 2015, pp. 57-61, vol. 8.
Martin Holcmann et al., "Mechanisms underlying skin disorders induced by EGFR inhibitors," Molecular & Cellular Oncology, Oct. 2, 2015, vol. 2, No. 4.
Yasuhiro Kimura et al., "Quality Assessment of Original and Generic Versions of Injectable Ritodrine Hydrochloride Products," Jpn. J Pharma Health Care Sci, Apr. 2006, pp. 667-672, vol. 32, No. 7.

(Continued)

*Primary Examiner* — Manjunath N Rao
*Assistant Examiner* — Jae W Lee
(74) *Attorney, Agent, or Firm* — Piloff Passino & Cosenza LLP; Rachel K. Piloff; Sean A. Passino

(57) ABSTRACT

A method for assessing the risk of cutaneous adverse drug reactions (CADRs) caused by an epidermal growth factor receptor inhibitor is provided, wherein the CADRs comprises but not limited to: maculopapular eruption (MPE), erythema multiforme (EM), Stevens Johnson syndrome (SJS), toxic epidermal necrolysis (TEN), and drug rash with eosinophilia and systemic symptoms (DRESS). Also provided is a detection kit for assessing the risk of developing CADRs in patients, the kit comprising a reagent for determining specific HLA alleles and a use of the detection kit in assessing the risk of developing CADR in a patient.

13 Claims, No Drawings

Specification includes a Sequence Listing.

(56) References Cited

OTHER PUBLICATIONS

Unknown, Drug Information for Generic Drug Switching (translated by GOOGLE), Jpn J Drug Inform 19(1) N1-N3 (2017).
Yoshiki Itoh et al., "High-throughput DNA typing of HLA-A, -B, -C, and -DRB1 loci by a PCR-SSOP—Luminex method in the Japanese population," Immunogenetics, Oct. 2005, pp. 717-729, vol. 57.
Jesus Zurdo Ph. D., Development suitability assessment as an early risk reduction tool in biopharmaceutical development (translated by Google), MEDCHEM News, vol. 24, No. 3, Aug. 2014 p. 10-15.
Office action for Singapore Patent Application No. 11202200714U, mailed May 1, 2023.
Daniel Fuerst et al., "HLA polymorphisms influence the development of skin rash arising from treatment with EGF receptor inhibitors," Pharmacogenomics., Oct. 12, 2012, pp. 1,469-1,476, vol. 13, No. 13.
Da, Meihong et al., "Mechanisms of Cutaneous Adverse Reactions Induced by Epidermal Growth Factor Receptor Inhibitors," The Chinese Journal of Dermatovenereology, Sep. 30, 2018, pp. 1,087-1,090, vol. 32, No. 9.
JPO Notice of Reasons for Refusal (Original) in application No. 2022508561, dated May 23, 2023.
SIPO Rejection decision (Original) in application No. 20198009855.4, dated Jan. 1, 2024 (no translation on Global Dossier yet).
Yoshiki Itoh, et al., High-throughput DNA typing of HLA-A, -B, -C, and -DRB1 loci by a PCR-SSOP—Luminex method in the Japanese population , Immunogenetics , 2005 , vol. 57 , p. 717-729.
Office action for related Korea Application No. 10-2022-7004151, mailed Jul. 9, 2024.

* cited by examiner

METHOD FOR ASSESSING RISK OF CUTANEOUS ADVERSE DRUG REACTIONS CAUSED BY EPIDERMAL GROWTH FACTOR RECEPTOR INHIBITORS, DETECTION KIT THEREOF, AND USE THEREOF

TECHNICAL FIELD

The present invention provides a method for evaluating the risk of developing cutaneous adverse drug reactions induced by epidermal growth factor receptor inhibitors (EGFRI), especially methods for evaluating the risk of developing cutaneous adverse drug reactions induced by anti-epidermal growth factor receptor monoclonal antibodies (mAb), epidermal growth factor receptor tyrosine kinase inhibitor (EGFR-TKI) and so on.

BACKGROUND TECHNIQUE

Cutaneous Adverse Drug Reactions (CADRs) have always been a major clinical problem, with very diverse manifestations, ranging from mild maculopapular eruption (MPE), erythema multiforme (EM) to severe cutaneous adverse drug reactions (SCARs), including: drug rash with eosinophilia and systemic symptoms (DRESS), Stevens-Johnson Syndrome (SJS), toxic epidermal necrolysis (TEN) and so on. The symptoms prior to the onset of Stevens-Johnson Syndrome (SJS) and toxic epidermal necrosis (TEN) are often flu-like symptoms, including fever, sore throat, swollen lips and so on, which rapidly progressed to generalized erythema, blisters, and inflammation and ulceration of the mucous membrane of eyes, oral cavity and genitals. In severe cases, the symptoms are similar to those of whole body burn. The biggest difference between the two is the percentage of epidermal separation: in SJS, the separation is less than 10% of the body surface area and in TEN, the separation exceeds 30% of the body surface area. The main clinical features of drug eruption with eosinophilia and systemic symptoms (DRESS) include fever, skin rash, increased eosinophils in the blood, lymphadenopathy and internal organ invasion. The most common and severely affected organ is the liver, which may lead to fulminant hepatitis, the most common cause of death in these patients. Other organ involvement leads to nephritis, myocarditis, pneumonia, and thyroiditis.

Adverse drug reactions are often associated with immune reactions, but the immune mechanisms are extremely complicated. For example, HLA-A has about 300 subtypes and HLA-B has about 600 genotypes. Therefore, it is difficult to ascertain the immune mechanism that underlines the adverse drug reaction.

Epidermal Growth Factor Receptor (EGFR) is regarded as an effective target for the development of anti-cancer therapy. EGFR targeted therapy has been on the market for more than 15 years, helping countless cancer patients to prolong their lives. Epidermal growth factor receptor inhibitors include anti-epidermal growth factor receptor monoclonal antibodies (mAb) and epidermal growth factor receptor tyrosine kinase inhibitors (EGFR-TKI). Among them, the mechanism of the anti-epidermal growth factor receptor monoclonal antibody is to specifically bind to the epidermal growth factor receptor and competitively inhibit the function of the epidermal growth factor, making cancer cells unable to proliferate. The commonly used monoclonal antibody drugs in clinical practice are Cetuximab, Zalutumumab, Nimotuzumab, Matuzumab and Panitumumab. EGFR-TKI is a drug that inhibits the activity of tyrosine kinase. Because tyrosine kinase acts as a switch for many signal transmissions in cells, it plays an important role in cell growth, proliferation and differentiation, and its mutations often cause cancer. Therefore, tyrosine kinase inhibitors can be used as anti-cancer drugs. In addition to inhibiting the proliferation of cancer cells, they can also prevent new angiogenesis and block the supply of nutrients and oxygen to cancer cells. Currently, the commonly used tyrosine kinase inhibitors in clinical practice include Erlotinib, Gefitinib, Lapatinib, Afatinib, Brigatinib, and so on.

Although epidermal growth factor receptor inhibitors can be used to treat a variety of cancers, the following adverse reactions are still common in clinical practice, including: gastrointestinal toxicity, pulmonary toxicity, hepatic toxicity, and cutaneous adverse drug reactions (CADRs) and so on. Due to the high expression level of EGFR in the epidermal basement membrane, the use of epidermal growth factor receptor inhibitors often causes cutaneous adverse drug reactions. Therefore, there is still a need for assessing the risk of developing cutaneous adverse drug reactions caused by epidermal growth factor receptor inhibitors. The present invention addresses this need and other needs.

SUMMARY OF THE INVENTION

The present invention provides a method for assessing the risk of developing cutaneous adverse drug reactions caused by epidermal growth factor receptor inhibitors in a patient, wherein the cutaneous adverse drug reaction include: maculopapular eruption (MPE), erythema multiforme (EM), Stevens Johnson Syndrome (SJS), toxic epidermal necrolysis (TEN) or drug rash with eosinophilia and systemic symptoms (DRESS). HLA-B*5101 allele and/or HLA-B*5102 allele are associated with cutaneous adverse drug reactions caused by epidermal growth factor receptor inhibitors.

Specifically, the present invention provides a method for assessing the risk of developing cutaneous adverse drug reactions induced by epidermal growth factor receptor inhibitors in patients, comprising the step of detecting the presence of HLA-B*5101 allele and/or HLA-B*5102 allele, wherein the presence of the HLA-B*5101 allele and/or HLA-B*5102 allele indicates the risk of cutaneous adverse drug reactions induced by epidermal growth factor receptor inhibitors. In a specific embodiment, the epidermal growth factor receptor inhibitor includes (but is not limited to) Cetuximab, Zalutumumab, Nimotuzumab, Matuzumab, Panitumumab, Erlotinib, Gefitinib, Lapatinib, Afatinib, or Brigatinib. The cutaneous adverse drug reactions include at least one adverse reaction selected from the following: maculopapular eruption (MPE), erythema multiforme (EM), Stevens Johnson Syndrome (SJS), Toxic epidermal necrolysis (TEN) or drug eruption with eosinophilia and systemic symptoms (DRESS). In one embodiment, the patient carries the HLA-B*5101 allele. In one embodiment, the patient carries the HLA-B*5102 allele. In one embodiment, the patient carries the HLA-B*5101 allele and HLA-B*5102 allele.

The present invention provides a reagent for detecting HLA-B*5101 allele and/or HLA-B*5102 allele in the manufacture of a detection kit for evaluating the risk of developing cutaneous adverse drug reactions induced by an epidermal growth factor receptor inhibitors. The kit includes a reagent for detecting at least one allele selected from: HLA-B*5101 or HLA-B*5102.

The presence of HLA-B*5101 allele, HLA-B*5102 allele, or a combination of HLA-B*5101 allele and HLA-B*5102 allele in a patient indicates that the patient has a higher than one time, higher than two times, higher than three times, higher than four times, higher than five times, higher than six times, higher than seven times, higher than eight times, higher than nine times, higher than ten times, higher than 20 times, higher than 30 times, higher than 40 times, higher than 50 times more than, higher than 60 times, higher than 70 times, higher than 80 times, higher than 90 times, higher than 100 times, higher than 110 times, higher than 120 times, higher than 130 times, higher than 140 times, higher than 150 times, higher than 160 times, higher than 1 to 30 times risk of developing drug allergic reaction compared to a patient without the HLA-B*5101 allele, HLA-B*5102 allele, or a combination of HLA-B*5101 allele and HLA-B*5102 allele.

Any known methods in the art for detecting alleles can be used, such as (but not limited to): an oligonucleotide that specifically hybridizes to the allele, serotyping or microcytotoxicity method to determine cDNA, RNA or protein product of the allele. [Kenneth D.McClatchey.Clinical Laboratory Medicine. 2002]. In one embodiment, the oligonucleotide specifically hybridizes to the DNA of the peripheral blood of the patient. The oligonucleotide is designed for the most variable sequences of HLA-B*5101 allele and/or HLA-B*5102 allele. In a specific embodiment, the oligonucleotide sequence of the forward primer 1 used to detect the presence of HLA-B*5101 or HLA-B*5102 is 5'-CGCTTCATTGCAGTGGGC-3' (SEQ ID NO.1); reverse primer 1 is 5'-TGGTCTTGAAGATCTGT GTGTTCC-3' (SEQ ID NO. 2); probe 1 sequence is 5'-AGAGAG-GAGCCGCG-3' (SEQ ID NO.3); probe 2 sequence is 5'-GACGGAGCCCCGG-3' (SEQ ID NO. 4); the oligonucleotide sequence of forward primer 2 is 5'-ACACTTGGCAGACGATGTATGG-3' (SEQ ID NO. 5), and reverse primer 2 is 5'-GGTCCAGGAGCTCAGGTCC-3' (SEQ ID NO. 6), probe 3 sequence is 5'-CGGCAAGGAT-TACAT-3' (SEQ ID NO.7) and probe 4 sequence is 5'-ACGGCAAAGATTACAT-3' (SEQ ID NO. 8).

The present invention provides a detection kit for assessing the risk of developing cutaneous adverse drug reactions induced by epidermal growth factor receptor inhibitors. The detection kit comprises a reagent that can detect at least one allele selected from: HLA-B *5101 or HLA-B*5102, wherein the presence of the at least one allele indicates a higher risk of developing cutaneous adverse drug reaction caused by the epidermal growth factor receptor inhibitor compared to a patient without the corresponding allele. In a specific embodiment, the cutaneous adverse drug reaction comprises at least one of the following adverse reactions: maculopapular rash, erythema multiforme, Stevens Johnson Syndrome, toxic epidermal necrosis or drug eruption with eosinophilia and systemic symptoms.

The present invention provides methods for reducing the incidence or treatment of cutaneous adverse drug reactions caused by epidermal growth factor receptor inhibitors.

The present invention also provides a method for assessing the risk of developing cutaneous adverse drug reaction caused by epidermal growth factor receptor inhibitors and treating said cutaneous adverse drug reaction, comprising the following steps: (a) detecting the presence of at least one allele selected from the following alleles in a sample of a subject: HLA-B*5101 or HLA-B*5102, (b) the presence of at least one of the following alleles in the sample: HLA-B*5101 or HLA-B*5102, indicates the subject has an increased risk of developing cutaneous adverse drug reactions induced by epidermal growth factor receptor inhibitor; and (c) administration of a drug to treat the cutaneous adverse drug reaction.

In a specific embodiment, the method of treating the cutaneous adverse drug reactions is administering a drug including (but not limited to) liquid, steroid, immunoglobulin, cyclosporine, anti-TNF-α agent or plasma exchange.

The present invention also relates to a method for assessing the risk of developing cutaneous adverse drug reactions induced by epidermal growth factor receptor inhibitors and reducing the incidence of said cutaneous adverse drug reactions, comprising the following steps: (a) detecting the presence of at least one allele selected from the following alleles in a sample of a patient: HLA-B*5101 or HLA-B*5102, (b) the presence of at least one of the following alleles in the sample: HLA-B*5101 or HLA-B*5102, indicates that the patient has an increased risk of developing a cutaneous adverse drug reaction; and (c) the patient is not given the epidermal growth factor receptor inhibitors.

The present invention further provides a method for treating a disease that can be treated by epidermal growth factor receptor inhibitor, comprising the following steps: (a) detecting the presence of at least one allele selected from the following alleles in a sample of a patient : HLA-B*5101 or HLA-B*5102, (b) the presence of at least one of the following alleles in the sample: HLA-B*5101 or HLA-B*5102, indicates that the patient has an increased risk of developing a cutaneous adverse drug reaction; and (c) avoid using the epidermal growth factor receptor inhibitor to treat this disease to reduce the risk of cutaneous adverse drug reactions.

The terms "invention" and "present invention" as used in the present invention are intended to broadly refer to the application the claims. The statements containing these terms are to be understood as not limiting the scope of the application or the scope of the claims. The working examples of the invention are defined by the application and not by the content of the present invention. This summary is a high-level overview of various aspects of the invention and is a description of some concepts that are further described in the section below. This Summary is not intended to identify key or essential features of the claimed application, and is not intended to be used solely to determine the scope of the claimed application. The objectives of the application should be understood by reference to any or all of the figures and the appropriate parts of each claim.

Working Example

In the following working example, 11 patients with epidermal growth factor receptor inhibitor induced CADRs (including MPE, EM, SJS/TEN, and DRESS), were enrolled for HLA typing by nucleic acid sequencing-based typing and the HLA typing results were compared with that of 2038 normal healthy controls. The results show that HLA-B*5101 allele, HLA-B*5102 allele or a combination of HLA-B*5101 allele and HLA-B*5102 allele were associated with CADRs induced by epidermal growth factor receptor inhibitors (see Table 1) .

With respect to HLA-B*5101 allele, 5 out of 11 patients (45.45%) with epidermal growth factor receptor inhibitor induced CADRs carried this genotype, whereas only 170 out of 2038 (8.34%) normal healthy subjects in the control group carried this genotype. This shows that HLA-B*5101 is associated with epidermal growth factor receptor inhibitor induced CADRs (CADRs vs. healthy control group: $P=1.30\times10^{-3}$, odds ratio or OR=9.16 (2.77-30.32), sensitivity: 45.45%, specificity: 91.66%).

With respect to the HLA-B*5102 allele, 4 out of 11 (36.36%) with epidermal growth factor receptor inhibitor induced CADRs carried this genotype, whereas only 64 out of 2038 (3.14%) normal healthy people in the control group had this genotype. This shows that HLA-B*5102 is associated with epidermal growth factor receptor inhibitor induced CADRs (CADRs vs. healthy control group: $P=3.07\times10^{-4}$, odds ratio or OR=17.63 (5.03-61.73), sensitivity: 36.36%, specificity: 96.86%).

Further analysis of the HLA-B*5101 allele and HLA-B*5102 allele combination shows such combination significantly increases the correlation with and sensitivity in predicting the risk of developing epidermal growth factor receptor inhibitor induced CADRs (CADRs vs. healthy control group: $P=1.80\times10^{-7}$, odds ratio or OR=34.69 (7.45-161.54), sensitivity: 81.81%, specificity: 88.52%).

Based on the above results, the presence of HLA-B*5101 allele and/or HLA-B*5102 allele can be used to assess the risk of developing CADRs caused by epidermal growth factor receptor inhibitors.

TABLE 1

Analysis and comparison of HLA-B*5101 and/or HLA-B*5102 genotypes of 11 patients with CADRs caused by epidermal growth factor receptor inhibitors and 2038 normal healthy controls.

| HLA Allele | CADRs N (%) | Healthy Control N (%) | OR (95% CI) | P Value | Sensitivity (%) | Specificity (%) |
|---|---|---|---|---|---|---|
| HLA-B*51:01 | 5/11 (45.45%) | 170/2038 (8.34%) | 9.16 (2.77-30.32) | $1.30 \times 10^{-3}$ | 45.45% | 91.66% |
| HLA-B*51:02 | 4/11 (36.36%) | 64/2038 (3.14%) | 17.63 (5.03-61.73) | $3.07 \times 10^{-4}$ | 36.36% | 96.86% |
| HLA-B*51:01/B*5102 | 9/11 (81.81%) | 234/2038 (11.48%) | 34.69 (7.45-161.54) | $1.80 \times 10^{-7}$ | 81.81% | 88.52% |

The foregoing is a description of the preferred embodiments of the present invention, and the present invention will be described in detail, and the subject matter of the present invention can be changed and modified without departing from the spirit and scope of the invention. Modifications are intended to be included within the scope of the following claims.

SEQUENCING LISTING

The instant application contains a Sequence Listing which is being submitted in
ASCII format via EFS-WEB and is hereby incorporated by reference in its entirety.
File name: 5_20220707_SEQUENCELISTING_ST25
Creation date: Sep. 1, 2022
Modified: Sep. 1, 2022
Byte size: 1,886 bytes

The invention claimed is:

1. A method for treating a cutaneous adverse drug reaction induced by an epidermal growth factor receptor inhibitor (EGFRI) in a patient in need thereof, comprising the following steps:
   (a) obtaining a sample from the patient, wherein the patient exhibits one or more symptoms of the cutaneous adverse drug reaction induced by EGFRI or at risk of developing the cutaneous adverse drug reaction induced by EGFRI,
   (b) detecting the presence of the following alleles from the sample of the patient:
   HLA-B*5101;
   HLA-B*5102; or
   HLA-B*5101 and HLA-B*5102,
   (c) identifying the patient as having the cutaneous adverse drug reaction or at risk of developing the cutaneous adverse drug reaction induced by EGFRI if at least one of the alleles in step (b) is present in the sample of the patient; and thereafter
   (d) administering a drug to treat the cutaneous adverse drug reaction induced by EGFRI.

2. The method according to claim 1, wherein said cutaneous adverse drug reaction induced by EGFRI is maculopapular eruption (MPE), erythema multiforme (EM), Stevens Johnson Syndrome, SJS), toxic epidermal necrolysis (TEN), or drug rash with eosinophilia and systemic symptoms (DRESS).

3. The method according to claim 1, wherein said HLA-B*5101 allele or HLA-B*5102 allele is detected in the DNA, RNA, proteins, cells or serum sample from the peripheral blood of the patient.

4. The method according to claim 1, wherein the epidermal growth factor receptor inhibitor is an anti-epidermal growth factor receptor monoclonal antibody (mAb) or an epidermal growth factor receptor tyrosine kinase inhibitor (EGFR-TKI).

5. The method according to claim 1, wherein the drug to treat the severe cutaneous adverse drug reaction is liquid, steroid, immunoglobulin, cyclosporine, anti-TNF-α agent or plasma replacement.

6. A method for reducing the incidence of a cutaneous adverse drug reaction induced by an epidermal growth factor receptor inhibitor (EGFRI) in a patient, comprising the following steps:
   (a) obtaining a sample from the patient, wherein the patient exhibits one or more symptoms of the cutaneous adverse drug reaction or is at risk of developing the cutaneous adverse drug reaction induced by EGFRI,
   (b) detecting the presence of at least one the following alleles from the sample from the patient:
   HLA-B*5101;
   HLA-B*5102; or
   HLA-B*5101 and HLA-B*5102,B*1502 allele,
   (c) identifying the patient as having the cutaneous adverse drug reaction or at risk of developing the cutaneous adverse drug reaction induced by EGFRI if at least one of the alleles in step (b) is present; and thereafter
   (d) administering a treatment that is not EGFRI to the patient having the cutaneous adverse drug reaction or at risk of developing the cutaneous adverse drug reaction induced by EGFRI.

7. The method according to claim 6, wherein said cutaneous adverse drug reaction induced by EGFRI is maculopapular eruption (MPE), erythema multiforme (EM), Stevens Johnson Syndrome, SJS), toxic epidermal necrolysis (TEN), or drug rash with eosinophilia and systemic symptoms (DRESS).

8. The method according to claim 6, wherein said HLA-B*5101 allele or HLA-B*5102 allele is detected in the DNA, RNA, proteins, cells or serum sample prepared from the peripheral blood of the patient.

9. The method according to claim 6, wherein the epidermal growth factor receptor inhibitor is an anti-epidermal growth factor receptor monoclonal antibody (mAb) or an epidermal growth factor receptor tyrosine kinase inhibitor (EGFR-TKI).

10. The method of claim 4, wherein the anti-epidermal growth factor receptor monoclonal antibody is Cetuximab, Zalutumumab, Nimotuzumab, Matuzumab or Panitumumab.

11. The method of claim 4, wherein the EGFR-TKI is Cetuximab, Zalutumumab, Nimotuzumab, Matuzumab, Panitumumab, Erlotinib, Gefitinib, Lapatinib, Afatinib, or Brigatinib.

12. The method of claim 9, wherein the anti-epidermal growth factor receptor monoclonal antibody is Cetuximab, Zalutumumab, Nimotuzumab, Matuzumab or Panitumumab.

13. The method of claim 9, wherein the EGFR-TKI is Cetuximab, Zalutumumab, Nimotuzumab, Matuzumab, Panitumumab, Erlotinib, Gefitinib, Lapatinib, Afatinib, or Brigatinib.

* * * * *

```
SEQUENCE LISTING

<160> NUMBER OF SEQ ID NOS: 8

<210> SEQ ID NO 1
<211> LENGTH: 18
<212> TYPE: DNA
<213> ORGANISM: Artificial Sequence
<220> FEATURE:
<223> OTHER INFORMATION: Synthesized

<400> SEQUENCE: 1
cgcttcattg cagtgggc                                                 18

<210> SEQ ID NO 2
<211> LENGTH: 24
<212> TYPE: DNA
<213> ORGANISM: Artificial Sequence
<220> FEATURE:
<223> OTHER INFORMATION: Synthesized

<400> SEQUENCE: 2
tggtcttgaa gatctgtgtg ttcc                                          24

<210> SEQ ID NO 3
<211> LENGTH: 14
<212> TYPE: DNA
<213> ORGANISM: Artificial Sequence
<220> FEATURE:
<223> OTHER INFORMATION: Synthesized

<400> SEQUENCE: 3
```
agagaggagc cgcg                                                14

<210> SEQ ID NO 4
<211> LENGTH: 13
<212> TYPE: DNA
<213> ORGANISM: Artificial Sequence
<220> FEATURE:
<223> OTHER INFORMATION: Synthesized

<400> SEQUENCE: 4
gacggagccc cgg                                                 13

<210> SEQ ID NO 5
<211> LENGTH: 22
<212> TYPE: DNA
<213> ORGANISM: Artificial Sequence
<220> FEATURE:
<223> OTHER INFORMATION: Synthesized

<400> SEQUENCE: 5
acacttggca gacgatgtat gg                                       22

<210> SEQ ID NO 6
<211> LENGTH: 19
<212> TYPE: DNA
<213> ORGANISM: Artificial Sequence
<220> FEATURE:
<223> OTHER INFORMATION: Synthesized

<400> SEQUENCE: 6
ggtccaggag ctcaggtcc                                           19

<210> SEQ ID NO 7
<211> LENGTH: 15
<212> TYPE: DNA
<213> ORGANISM: Artificial Sequence
<220> FEATURE:
<223> OTHER INFORMATION: Synthesized

<400> SEQUENCE: 7
cggcaaggat tacat                                               15

<210> SEQ ID NO 8
<211> LENGTH: 16
<212> TYPE: DNA
<213> ORGANISM: Artificial Sequence
<220> FEATURE:
<223> OTHER INFORMATION: Synthesized

<400> SEQUENCE: 8
acggcaaaga ttacat                                              16